C. W. CANFIELD.
FORGE.
APPLICATION FILED DEC. 15, 1915.

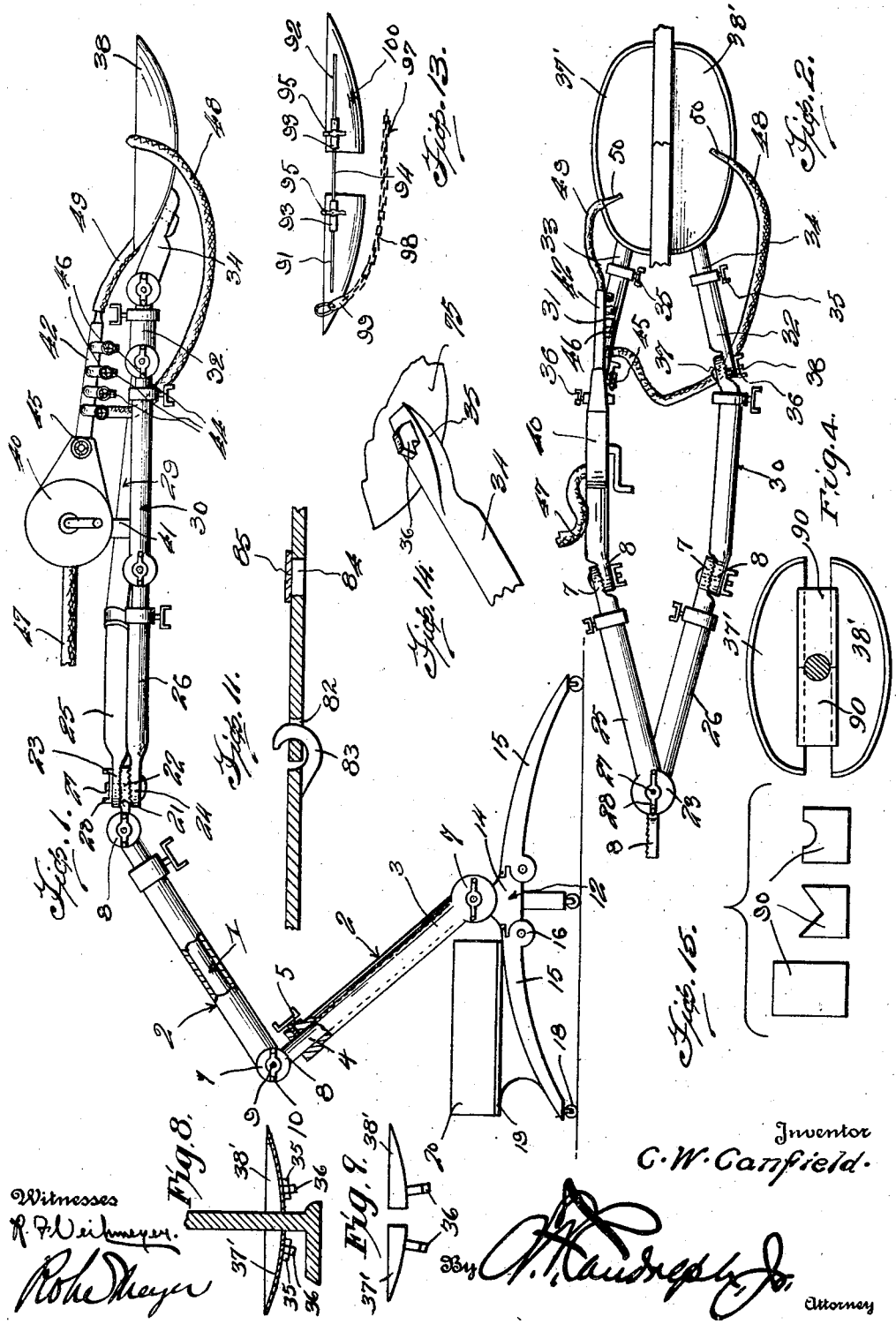

1,247,076.

Patented Nov. 20, 1917.
2 SHEETS—SHEET 2.

Witnesses
Inventor
C. W. Canfield
BY
Attorney

UNITED STATES PATENT OFFICE.

CARLTON W. CANFIELD, OF BROWNTOWN, MINNESOTA.

FORGE.

1,247,076.  Specification of Letters Patent.  Patented Nov. 20, 1917.

Application filed December 15, 1915. Serial No. 66,994.

*To all whom it may concern:*

Be it known that I, CARLTON W. CANFIELD, a citizen of the United States, residing at Browntown, in the county of McLeod, and State of Minnesota, have invented certain new and useful Improvements in Forges; and I do hereby declare the following to be a full, clear, and exact description of the invention, such as will enable others skilled in the art to which it appertains to make and use the same.

This invention relates to a preheater and heat maintainer for use in connection with gas welding torches and the primary object of the invention is to provide a device of this nature by means of which a quicker heat, a higher and more even heat may be provided and applied to the article to be welded, at the exact point desired, and a device which will maintain that heat throughout the entire operation of welding.

Another object of this invention is to provide in a preheater and heat maintaining device for use in connection with hydrogen and oxygen gas welding torches, a fire pan or forge pan which may be used on the floor or which may be taken to the broken part of the article to be welded, so that the heat may be applied directly to the part which is to be welded.

Another object of this invention is to provide a fire-pan or forge pan as specified which is made in a plurality of sections so that it can be fitted into and around broken parts to be welded for maintaining a uniform degree of heat throughout the act of welding.

A still further object of this invention is to provide a portable bracket or crane support, which is adjustable both throughout its length and laterally, providing a flexible support for the fire-pan, by means of which the latter may be moved to any desired position.

A still further object of this invention is to provide an adjustable and expansible furnace wall for positioning in the fire-pan about the article to be welded for aiding in localizing the heat and maintaining the desired thermal degree for gas welding.

Other objects of the invention are: to provide a base for the crane or support which may be folded into a compressed form when desired; to provide a clamp structure for attachment to the base portion of the crane or support, which clamp may be attached to any part of a machine or device for supporting the forge pan carrying crane; to provide a novel form of rotating vise attachments for the crane for holding and revolving small pieces of work to be welded, which device is constructed so that the jaws of the same may be quickly and conveniently adjusted and remain always in parallel plane.

With the foregoing and other objects in view this invention consists in such novel features of construction, combination and arrangement of parts as will be hereinafter more fully described, illustrated in the accompanying drawings, and claimed.

In describing the invention in detail reference will be had to the accompanying drawings wherein like characters designate like and corresponding parts throughout the several views, and in which:—

Figure 1 is a side elevation of the improved preheater and heat maintainer, showing parts thereof broken away, and showing the improved flexible supporting crane.

Fig. 2 is a fragmentary plan view of the structure illustrated in Fig. 1.

Fig. 4 is a top plan view of the sectional pan structure, showing the same mounted for use in heating a wheel spoke or other round article.

Figure 10:
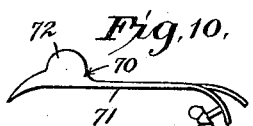
Figure 12:
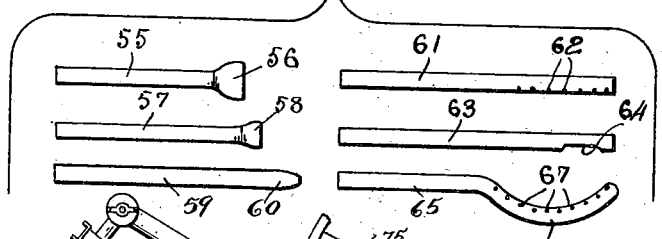

Fig. 8 is a sectional view through a piece of work showing the sectional pan attached thereto, Fig. 9 is an end view of a sectional fire pan, Fig. 10 is a side elevation of the clamp attached to the fire pan for supporting the air blast hose, Fig. 11 is a cross sectional view through the flexible fire wall showing the manner of hingedly connecting the sections of the same, Fig. 12 is a view of a plurality of modified forms of air nozzle, used in connection with the device, Fig 13 is a side elevation of the sectional fire pan, Fig. 14 is a detail perspective view of the manner of attaching the supporting arms of the flexible support or crane to the fire pan, Fig. 15 is a view showing a plurality of plates employed for filling up the space between the sections of the sectional fire pan.

Referring more particularly to the drawings, 1 designates the flexible crane or bracket structure, as an entirety, which bracket structure is composed of a plurality of sections 2. Each of the sections 2 are composed of telescoping members 3 and 4. The members 4 are slidably mounted for telescoping within the members 3, and they are held in place by set screws 5 which extend through rings 6. The rings 6 encompass the outer sections 3, as is clearly shown in the drawings. The outer members or sections 3 of the sections 2 have disks 7 formed upon their lower ends, which coact with disks 8 that are formed upon the ends of the inner members 4. The facing sides of the disks 7 and 8 are corrugated so as to prevent accidental movement of one of the sections 2 with respect to the other. Set screws 9 extend through the disks 7 and 8 and have substantially U-shaped heads indicated at 10 formed thereupon for facilitating the rotation of the set screws for holding the disks 7 and 8 in firm clamping engagement with each other.

The lowermost section 2 of the crane or bracket structure 1 is connected, through the medium of the disk 7 formed thereupon, to a base structure 12. The base structure 12 includes a body 14, which has a disk corresponding to the disks 7 and 8 formed thereupon which disk is adapted for facial abutment with the disk 7 carried by the lowermost section 2. A plurality of legs 15 are hingedly connected to the body 14 as is shown at 16, and they have casters or rollers 18 mounted upon their lower outer ends for facilitating the easy and free movement of the crane or bracket structure from one point to another.

One of the legs 15 has a bracket structure 19 formed thereupon which supports a box or retainer 20. The box or retainer 20 is adapted for receiving counter-balancing weights for preventing the crane structure from tipping over when in use.

The uppermost section 2 of the crane structure is connected to a coupling 21. The coupling 21 has a disk carried thereby which is adapted for coaction with the disk 8 carried by the uppermost section 2. The coupling 21 also has a disk 22 formed thereon, both sides of which are corrugated as is clearly shown in Fig. 1 of the drawings. The corrugated disk 22 is adapted for facial abutment with the disks 23 and 24 formed upon the ends of the sections 25 and 26, respectively. The sections 25 and 26 are held connected to the coupling 21, by a set screw 27 and a nut 28 which is mounted upon the set screw, in the same manner in which the nuts or heads 10 are mounted upon the various set screws used for holding the disks 7 and 8 together.

The sections 25 and 26 form the first sections of arms 29 and 30. The arms 29 and 30 composed of a plurality of telescoping sections which are connected in the same manner in which the sections 2 are connected, and the length of which may be extended to the full length of the telescoping members of the sections when desired.

Couplings 31 and 32 are connected to the end of the outermost sections of the arms 29 and 30, and the sections 31 and 32 are hollow and have rods 33 and 34 respectively, adjustably connected thereto and held in place by means of set screws 35. The sections 31 and 32 are connected to the outermost sections of the arms 29 and 30 by means of disks 36 formed upon their ends which coact with disks 37 formed upon the ends of the outermost sections of the arms.

The disks 36 and 37 have their abutting faces corrugated and these disks are held in various adjusted positions with respect to each other by means of set screws 38 which are of the same construction as the set screws heretofore described.

The rods 33 and 34 have their outer ends reduced and shaped substantially the shape of an ordinary stove lid lifter, as is clearly shown in Fig. 14.

The reduced ends 35 of the rods 33 and 34 are adapted for insertion in the depending lugs 36 carried by the sections 37' and 38' of a sectional fire pan.

The arm 29, has an ordinary forge fan 40 mounted thereon and held in place by a clamping structure 41 which engages the arm 29. The fan structure 40 has a nozzle 42 communicating with the outlet of the same, which nozzle has a plurality of branches 44 formed thereon. The communication between the nozzle 42 and the fan casing is controlled by a valve structure 45, and the outlet of air through each of the branch nozzles 44 is controlled by the operation of valves 46 which are positioned within the branches 44. A hose or conduit 47 which may communicate with any suitable air supply source may be attached to the nozzle 42 if it is so desired, and the air supplied by the source through the pipe 47 utilized in lieu of the air blast created by the operation of the fan structure 40 without departing from the spirit of this invention. Flexible air hose 48 and 49 are connected to certain of the branch nozzles 44. Outlet nozzles 50 are detachably connected to the ends of the hose 48 and 49 and are adapted for extension over the edges of the pan 37 for forcing a blast of air into the same.

In Fig. 12 of the drawings, a plurality of different forms of the outlet nozzle are shown. The nozzle 55 has a flared flattened outlet end as is shown at 56. The nozzle 57 has a flared flattened outlet end as is shown at 58, which end is narrower than the end 56. The nozzle 59 has its outlet end reduced, as is shown at 60 for ejecting the air therefrom in a relatively small forceful stream. The nozzle 61 is provided with a plurality of spaced openings 62 formed along its side through which openings the air is adapted to travel in a plurality of relatively small streams. The nozzle shown at 63 is provided with a slot 64 through which the air travels. The nozzle 65 has its outlet end curved as is clearly shown at 66, which curved portion is provided with a plurality of spaced relatively small openings 67 through which the air egresses.

Figure 7:
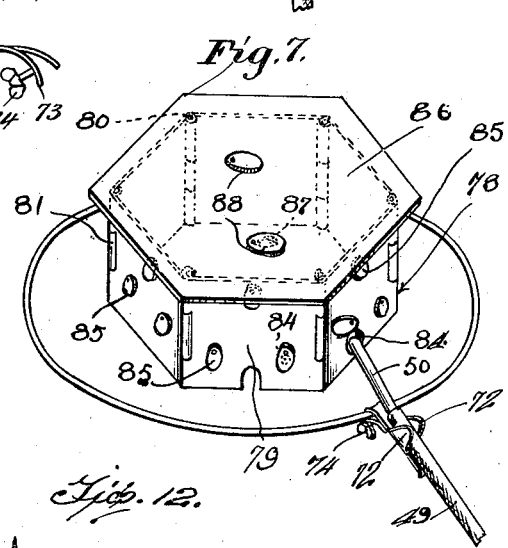
Fig. 7 is a detail perspective view of a fire pan showing the improved flexible wall positioned thereon, and the manner of attaching the air blast hose to the fire pan.

A clamp structure illustrated at 70 in Fig. 10 of the drawings, the use of which is illustrated in Fig. 7 is provided for holding the hose 48 and 49 in their proper positions with respect to the fire or forge pan.

The clamp or supporting structure 70 includes a body plate 71 which has resilient ears 72 formed thereon. The resilient ears 72 are bent upwardly from the body 71, and are shaped for resiliently gripping the hose 48 or 49. The end of the body plate 71 remote from the end upon which the ears 72 are formed has a tongue 73 cut therefrom and bent downwardly. The tongue 73 is positioned upon the underside of the edge of the fire pan while the portion of the body plate left after the tongue has been cut therefrom is adapted for engagement with the upper or inner surface of the edge of the fire pan. A set screw 74 is carried by the tongue 73 for engagement with the fire pan for securely clamping the hose clamp structure 70 upon the fire pan.

Figure 6:
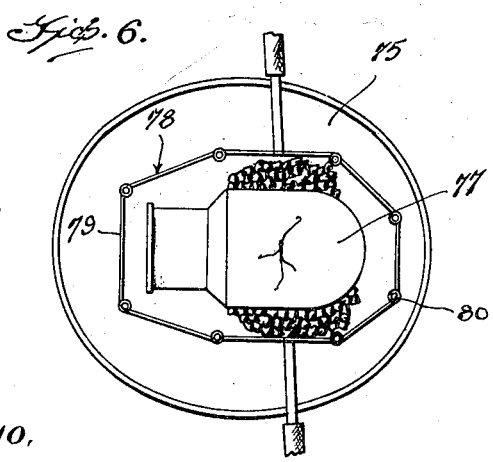
Fig. 6 is a plan view of a fire-pan showing the flexible fire wall positioned therein about an article to be welded.

In Fig. 6, one of the solid fire pans 75 is shown in use. This figure illustrates an engine cylinder, indicated by the numeral 77 positioned upon or within the fire pan 75. In using a device such as a cracked engine cylinder or the like, which may be placed within one of the fire pans, an adjustable and relatively flexible fire wall indicated by the numeral 78 is positioned about the article to be heated.

The fire wall 78 is composed of a plurality of hingedly connected sections 79. In Figs. 6 and 7, the sections 79 are shown as being hingedly connected by pintles 80 which extend through sleeves 81 formed upon the ends of the various sections. In Fig. 11, the modified form or manner of hinging the sections together is shown. In this figure, the sections 80 and 81 are hinged together by a hook structure analogous to that used in the forming of sprocket chains. The sections have eyes indicated at 82 formed upon one of their ends and hooks indicated at 83 formed upon their other ends, such hooks and eyes are adapted for coaction as shown in Fig. 11 for hingedly connecting the various sections 80 for forming the fire wall 78. The various sections 79 of the fire wall 78 are provided with openings indicated at 84, which provide peep or sight openings for the interior of the wall and also openings through which the nozzle structures carried by the hose 48 and 49 may be inserted for ejecting the blast of air interiorly of the wall 78. Flap covers indicated at 85 are pivotally connected to the sections 79 and are provided for normally closing the openings 84. A top plate 86 is mounted upon the upper edges of the sections 79 forming a complete housing about the article to be heated. The cover plate 86 is provided with sight openings 87, which are normally closed by pivotally supported flaps 88. The fire wall 78 is filled with charcoal, or coke, or both, or any analogous fuel desired, so that the article to be welded may be pre-heated before the welding torch is used thereon.

Figure 5:
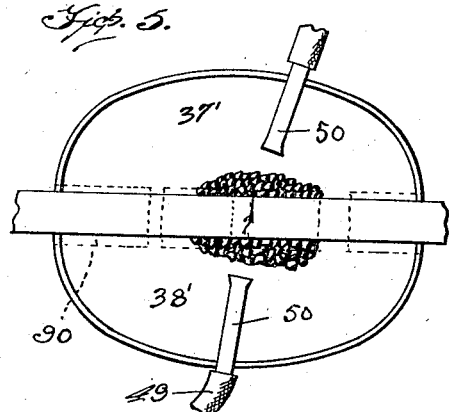
Fig. 5 is a top plan view of the sectional fire or forge pan showing it applied to a piece of work.

The sectional fire or forge pans which are particularly illustrated in Figs. 9 and 13, are preferably constructed of a pair of half sections of the pan, so that each section may be placed upon the opposite sides of a piece of work, as is clearly shown in Figs. 2, 5 and 8 of the drawings. In Figs. 2 and 5, the sectional pans are attached to the portion of a wheel rim, for the purpose of preheating the rim prior to the welding of the same with or by a gas welding torch. When the sectional pan is used in connection with the flexible crane or bracket, the two sections 37 and 38 of the pan are held in their proper place by the adjustment of the arms 29 and 30. In Fig. 15, a plurality of filler plates, generically indicated by the numeral 90 are shown, which plates are placed within the sectional pan over the space left between the facing edges of the sections of the pan, which is not occupied or taken up by the article to be preheated, thereby providing a bottom for the pan upon which the charcoal, coke or any analogous heating fuel may be positioned. Certain of the plates 90 are provided with cutout portions in their edges for fitting snugly about different types of work.

In Fig. 13, a structure is shown by means of which the sectional pan may be attached to a piece of work to be preheated, without necessitating the use of the bracket or crane structure 1. The sections 91 and 92 of the pan illustrated in Fig. 13 are provided with bearings 93 formed thereon adjacent their straight edges, through which bearings, rods 94 extend. The rods 94 are held in various adjusted positions by the adjustment of set screws 95 which extend through the bearings 93 and engage the rods. A flexible tying member 97 is also provided for further facilitating in holding the pan in its proper position. The member 97 comprises a chain or analogous flexible member 98 which has a clamp structure 99 mounted upon one end. The claws 100 are formed upon the sections 91 and 92, and the flexible chain 98 is drawn taut and attached to these claws for aiding the rods 94 in holding the sections 91 and 92 in their proper positions against accidental movement.

Figure 3:
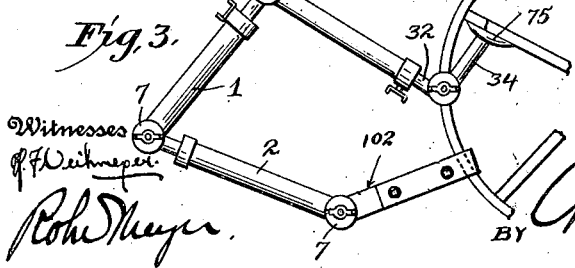
Fig. 3 is a side elevation of the improved preheater and heat maintainer showing the flexible crane attached to the articles to be welded by means of the improved clamp structure.

In Fig. 3 of the drawings, a clamp structure generically indicated by the numeral 102 is illustrated, which clamp structure is provided for attaching the fire pan and supporting arms to a wheel rim or like article.

When the sectional fire or forge pans are used they are positioned about the work as is clearly shown in Figs. 5 and 8 of the drawings, and they are filled with charcoal, coke, or other analogous fuel, which is ignited and subjected to a blast of air, by the operation of the fan structure 40 or through the air supply pipe 47, which will create heat for preheating the article to be welded, and also which will maintain a uniform thermal degree about the work to be welded during the entire operation of welding the same, eliminating the necessity of stopping the welding operation for preheating the article to be welded particularly when the article is relatively large.

The fire pans illustrated in Fig. 4 of the drawings are provided, for use in connection with the supporting structure, for heating various types of articles. For instance in case a small article is to be pre-heated before welding, the smaller pan 75 is employed, whereby the necessity of using an unnecessary quantity of fuel is eliminated, thereby instigating a saving of fuel. The other pans are used in connection with articles of corresponding sizes.

When the sectional pans 37' and 38' are employed, as illustrated in Fig. 5 of the drawings, the plates 90 are placed over the spaces between the edges of the pans, when the pans are used for supporting fuel about an article to be heated such as a wheel rim or the like, as indicated in Fig. 5, so as to prevent the fuel from falling between the pan sections which is not filled by the article to be heated.

In Fig. 3 of the drawings, the improved pre-heater is illustrated as attached to a metallic wheel, of any suitable type of vehicle, such as a farm wagon, a tractor or the like for the purpose of mending a cracked or broken spoke and through the provision of the clamp 102, the supporting arm 1 is securely attached to any suitable portion of the wheel which the pan 75 is positioned beneath the cracked portion of the spoke or rim.

Generically, the function of the device is as previously stated to pre-heat articles to be welded which articles are placed in one of the fire pans, which are carried by the arm 34, after which, coal, coke, or analogous fuel is placed about the article and ignited, and the air is turned upon the fuel for creating a draft for increasing the burning or combustion of the fuel so as to properly pre-heat articles positioned within the pan.

From the foregoing description taken in connection with the accompanying drawings the advantage of construction and of the method of operation of the improved pre-heater and heat maintainer for use in connection with gas welding torches will be readily apparent to those skilled in the art to which the invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What I claim is:

1. In a device as set forth, the combination of a fire pan composed of two sections, eyes formed upon said sections, rods inserted through said eyes, set screws carried by said eyes for engagement with said rods for holding said sections connected, claws formed upon said sections, and a flexible member adapted for attachment to one section and connection with the claw carried by the other section.

2. In a device as set forth, the combination of a hollow fire pan, and a fire wall for positioning within said fire pan, said fire wall composed of a plurality of hingedly connected sections.

3. In a device as set forth, the combination of a hollow fire pan, and a fire wall for positioning within said fire pan, said fire wall composed of a plurality of hingedly connected sections, said hingedly connected sections being provided with a plurality of openings, and covers pivotally connected to said sections for normally closing said openings.

4. In a device as set forth, the combination of a hollow fire pan, and a fire wall for positioning within said fire pan, said fire wall composed of a plurality of hingedly connected sections, said hingedly connected sections being provided with a plurality of openings, certain of said openings being provided for receiving an air blast nozzle, pivotally mounted flaps carried by said guides and adapted to form closures for certain of said openings, and a cover plate for mounting upon the upper edge of said fire wall.

5. In a device as set forth, the combination of a fire pan, a fan structure, an outlet nozzle communicating with the outer opening of said fan and having a plurality of branch outlets formed thereon, flexible conduits adapted for connection with any one of said branch outlets, nozzles carried by said flexible conduits and adapted for extending over the edges of said fire pan for guiding an air blast into said fire pan, and for controlling the passage of air through said branch outlets.

6. In a device as set forth, the combination, of a fire pan, a fan structure, an outlet nozzle communicating with the outlet opening of said fan and having a plurality of branch outlets formed thereon, flexible conduits adapted for connection with any of said branch outlets, nozzles carried by said flexible conduits and adapted for extending over the edges of said fire pan for guiding an air blast into the fire pan, valves for controlling the passage of air through said branch outlets, and a fire wall adapted for positioning within said pan, a wall composed of a plurality of hingedly connected sections, said sections being provided with openings to permit of the insertion of said nozzles therethrough, and pivotal covers for normally closing said openings.

In testimony whereof I affix my signature in presence of two witnesses.

CARLTON W. CANFIELD.

Witnesses:
W. A. LARAWAY,
WILLIAM PEIK.

Copies of this patent may be obtained for five cents each, by addressing the "Commissioner of Patents, Washington, D. C."